US006972609B2

(12) United States Patent
Shimamoto

(10) Patent No.: US 6,972,609 B2
(45) Date of Patent: Dec. 6, 2005

(54) SEMICONDUCTOR INTEGRATED CIRCUIT DEVICE WITH A PLURALITY OF INTERNAL CIRCUITS OPERABLE IN SYNCHRONISM WITH INTERNAL CLOCK

(75) Inventor: Mitsuhiro Shimamoto, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 10/803,983

(22) Filed: Mar. 19, 2004

(65) Prior Publication Data

US 2004/0196731 A1 Oct. 7, 2004

(30) Foreign Application Priority Data

Mar. 28, 2003 (JP) ............................ 2003-091782

(51) Int. Cl.[7] ................................................ G06F 1/04
(52) U.S. Cl. ...................................... 327/295; 713/501
(58) Field of Search ............................... 327/291–293, 327/295, 296, 165; 375/340, 342; 713/400, 713/500–503, 600, 601

(56) References Cited

U.S. PATENT DOCUMENTS

| | | | | |
|---|---|---|---|---|
| 4,817,148 | A * | 3/1989 | Lafferty et al. | 380/268 |
| 5,774,702 | A * | 6/1998 | Mitsuishi et al. | 713/501 |
| 5,889,824 | A * | 3/1999 | Ueda | 375/344 |
| 6,073,223 | A * | 6/2000 | McAllister et al. | 711/167 |
| 6,756,827 | B2 * | 6/2004 | Konuk et al. | 327/116 |

FOREIGN PATENT DOCUMENTS

| | | |
|---|---|---|
| JP | 2937919 B2 | 6/1999 |

* cited by examiner

*Primary Examiner*—Minh Nguyen
(74) *Attorney, Agent, or Firm*—Sughrue Mion, PLLC

(57) ABSTRACT

A second clock is generated as an intermittent train of pulses by removing some pulses from a first clock having a predetermined period, and is supplied as an internal clock to internal circuits of a semiconductor integrated circuit device. At the same time, a current generating circuit for consuming a power supply current is operated in timed relation to a third clock which comprises a train of pulses to be removed from the first clock.

5 Claims, 4 Drawing Sheets

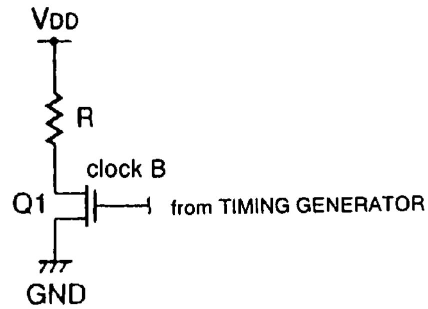
F I G. 2
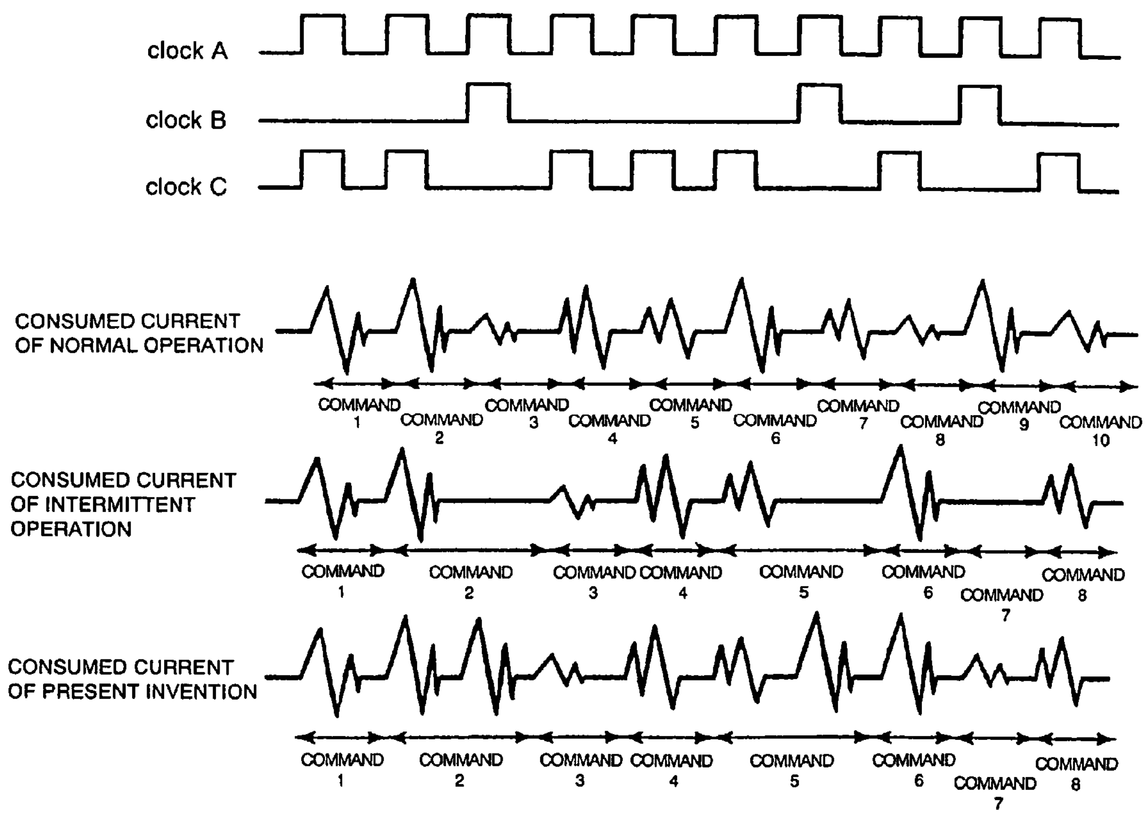
F I G. 3

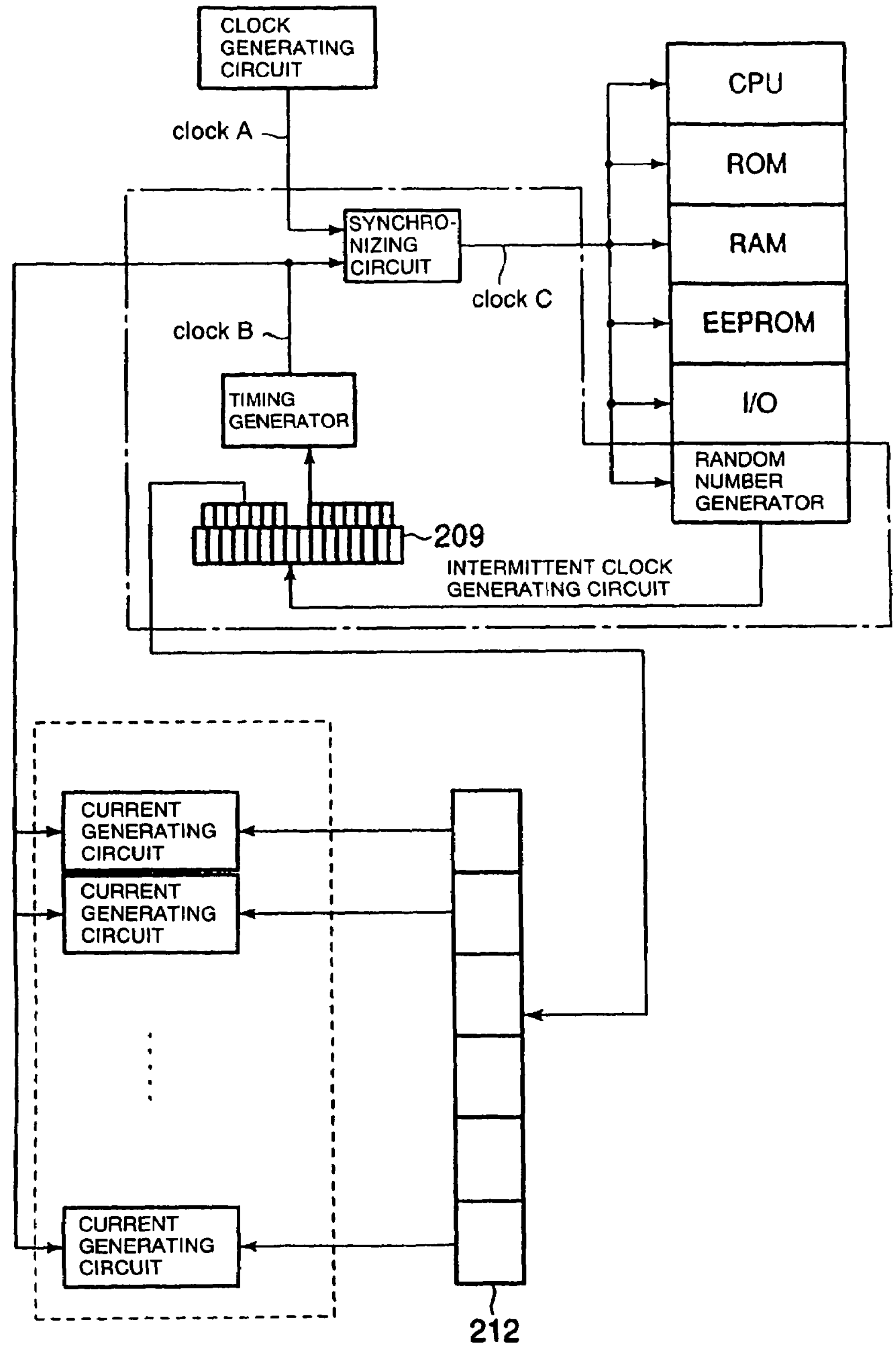
F I G. 5

SEMICONDUCTOR INTEGRATED CIRCUIT DEVICE WITH A PLURALITY OF INTERNAL CIRCUITS OPERABLE IN SYNCHRONISM WITH INTERNAL CLOCK

BACKGROUND OF THE INVENTION

1. Field of the Invention

The present invention relates to a semiconductor integrated circuit device having a plurality of internal circuits which is operable in synchronism with an internal clock.

2. Description of the Related Art

In recent years, many semiconductor integrated circuit devices such as microcomputers or the like have various internal circuits made up of CMOS (Complementary Metal-Oxide Semiconductor) which is advantageous for more highly integrated designs and lower current consumption. CMOS circuits consume a power supply current when their output changes from "1" to "0" or from "0" to "1". Particularly, if a semiconductor integrated circuit device has a bus line that is connected to a large capacitive load and is driven by CMOS circuits, then the semiconductor integrated circuit device consumes a large amount of current when data on the bus line changes from "1" to "0" or from "0" to "1". This means that it is possible to read a data processing sequence performed in the semiconductor integrated circuit device and also data processed in the semiconductor integrated circuit device by observing the current that is consumed by the semiconductor integrated circuit device. That is, by observing changes in the current that is consumed by the semiconductor integrated circuit device, one may possibly be able to recognize what data is being transmitted over the bus line, how the semiconductor integrated circuit device is operating, and what data is being processed by the semiconductor integrated circuit device. Therefore, it is necessary to have the technology for making it virtually impossible to reproduce data based on the observation of a consumed current waveform thereby to protect user programs and internal data that are saved in semiconductor integrated circuit devices.

One conventional approach to the protection of user programs and internal data is to encrypt such user programs and internal data. For example, Japanese patent No. 2937919 discloses a pseudorandom number generator for generating random numbers for use in program and data encryption.

According to a simple process of reducing the data dependency of a consumed current waveform, a false current having a predetermined period not depending on data changes is supplied at all times to a semiconductor integrated circuit device.

However, since the current consumed by the semiconductor integrated circuit device is increased by the false current that is supplied at all times thereto, the semiconductor integrated circuit device is limited in its application. Furthermore, the ability of the process to protect programs and internal data is relatively low because the presence of the false current may be determined from the observation of a consumed current waveform.

SUMMARY OF THE INVENTION

It is therefore an object of the present invention to provide a semiconductor integrated circuit device which makes it difficult to reproduce saved data based on the observation of a consumed current waveform without unduly increasing the consumed current, for thereby increasing the ability to protect programs and internal data.

To achieve the above object, a semiconductor integrated circuit device according to the present invention has an intermittent clock generating circuit which generates a second clock as an intermittent train of pulses by removing some pulses from a first clock having a predetermined period, and supplies the second clock as an internal clock to each internal circuit of the semiconductor integrated circuit device. At the same time, a current generating circuit for consuming a power supply current is operated in timed relation to a third clock which comprises a train of pulses to be removed from the first clock.

With the above arrangement, even if the internal circuits are operated with the second clock, the waveform of a consumed current of the semiconductor integrated circuit device varies in the same manner as when the internal circuits are normally operated with the first clock.

Therefore, it is difficult to distinguish the consumed current waveform that is observed when the internal circuits are operated with the second clock, from the consumed current waveform that is observed when the internal circuits are normally operated with the first clock. Accordingly, it is difficult to reproduce a data processing sequence (program) and internal data being processed, even by analyzing the consumed current waveform. The ability to protect programs and internal data saved in the semiconductor integrated circuit device is increased. Furthermore, the consumed current is prevented from unnecessarily increasing because there is no need to supply a false current at all times to the semiconductor integrated circuit device.

The above and other objects, features, and advantages of the present invention will become apparent from the following description with reference to the accompanying drawings which illustrate examples of the present invention.

BRIEF DESCRIPTION OF THE DRAWINGS

FIG. 2 is a circuit diagram of a current generating circuit in the semiconductor integrated circuit device shown in FIG. 1;

FIG. 3 is a timing chart representing the operation of the semiconductor integrated circuit device shown in FIG. 1;

FIG. 5 is a block diagram of a semiconductor integrated circuit device according to a third embodiment of the present invention.

DETAILED DESCRIPTION OF THE PREFERRED EMBODIMENTS

1st Embodiment

Figure 1:
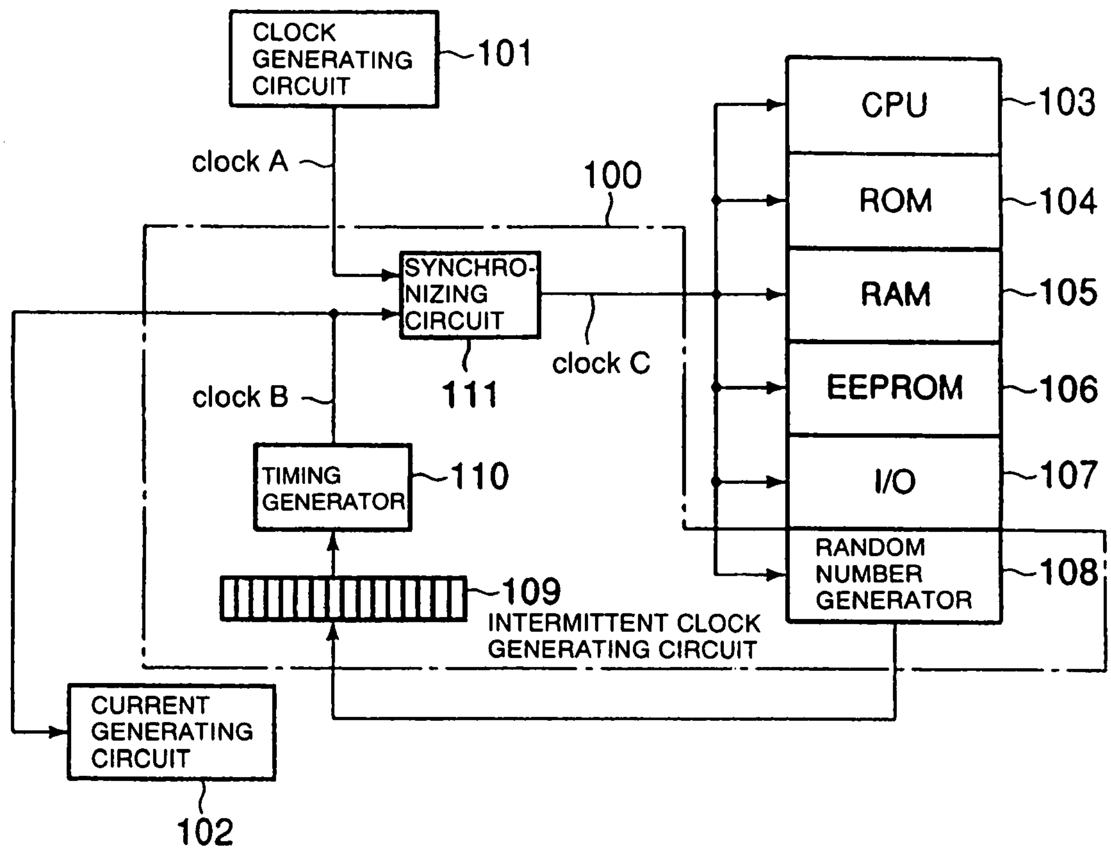
FIG. 1 is a block diagram of a semiconductor integrated circuit device according to a first embodiment of the present invention.

As shown in FIG. 1, a semiconductor integrated circuit device according to a first embodiment of the present invention comprises central processing unit (CPU) 103, ROM 104, RAM 105, and EEPROM 106 which serve as a memory device, input/output port (I/O) 107 serving as an interface for transmitting data to and receiving data from a circuit external to the semiconductor integrated circuit device, clock generating circuit 101 for generating a clock A (first clock) having a predetermined period, intermittent clock generating circuit 100 for generating a clock C (second clock) which comprises an intermittent train of pulses by removing some pulses from the clock A, and current generating circuit 102 for consuming a power supply current in timed relation to a clock B (third clock) which comprises a train of pulses to be removed from the clock A.

Intermittent clock generating circuit 100 comprises random number generator 108 for generating a random number, register 109 for temporarily holding the random number output from random number generator 108, timing generator 110 for generating the clock B according to the random number output from random number generator 108, and synchronizing circuit 111 for generating the clock C by being supplied with the clock B and the clock A and stopping outputting the clock A in timed relation to the clock B.

In FIG. 1, the semiconductor integrated circuit device is shown as having CPU 103, ROM 104, RAM 105, EEPROM 106, and I/O 107 as internal circuits thereof. However, the internal circuits of semiconductor integrated circuit device are not limited to those circuits, but may have various circuits having other functions.

Clock generating circuit 101 generates the clock A having the predetermined period and supplies the clock A to synchronizing circuit 111. If the clock C which comprises an intermittent train of pulses is not used, then the clock A is used as an internal clock for synchronously operating the various internal circuits of the semiconductor integrated circuit device, such as CPU 103, ROM 104, RAM 105, EEPROM 106, I/O 107, random number generator 108, etc.

Clock generating circuit 101 may be a circuit for oscillating the clock A with a quartz crystal oscillator, a ring oscillator, or the like which is well known in the art, or a circuit for generating the clock A from a clock supplied from an external circuit. Clock generating circuit 101 may be arranged to control the start or stoppage of oscillation according to a signal supplied from an external circuit.

Timing generator 110 receives a random number generated by random number generator 108 through register 109, and generates the clock B which is "1" when the value of the random number is in conformity with a preset value, for example.

Synchronizing circuit 111 is supplied with the clock B and the clock A that is output from clock generating circuit 101, and stops outputting the clock A when the clock B is "1", thereby generating the clock C which is an intermittent train of pulses. In the present embodiment, the internal circuits (CPU 103, the memory, I/O 107, etc.) of the semiconductor integrated circuit device are operated using the clock C as an internal clock. In the present embodiment, furthermore, current generating circuit 102 is operated in timed relation to the clock B which comprises a train of pulses to be removed from the clock A. With this arrangement, even when the internal circuits are operated with the clock C which is an intermittent train of pulses, the waveform of the consumed current of the semiconductor integrated circuit device varies in the same manner as when the internal circuits are normally operated with the clock A. Therefore, it is difficult to distinguish the consumed current waveform that is observed when the internal circuits are operated with the clock C, from the consumed current waveform that is observed when the internal circuits are normally operated with the clock A. Accordingly, it is difficult to analyze the dependency of data being processed on the consumed current waveform.

Random number generator 108 comprises, for example, a pseudorandom number generator for generating pseudorandom numbers, using a known linear feedback shift register.

Current generating circuit 102 comprises, as shown in FIG. 2, resistor R and n-channel MOS transistor Q1 which are connected in series with each other and inserted between power supply VDD and ground potential GND. With the arrangement shown in FIG. 2, a current flowing through current generating circuit 102 is determined by the value of resistor R.

Operation of the semiconductor integrated circuit device according to the first embodiment will be described below with reference to FIG. 3. FIG. 3 is a timing chart showing a consumed current waveform produced when the internal circuits of the semiconductor integrated circuit device are operated with the clock A (normally operated), a consumed current waveform produced when the internal circuits of the semiconductor integrated circuit device are operated with the clock C, and a consumed current waveform produced when the internal circuits of the semiconductor integrated circuit device are operated with the clock C and current generating circuit 102 is operated with the clock B.

As shown in FIG. 3, if the internal circuits of the semiconductor integrated circuit device are intermittently operated with the clock C, then the consumed current becomes smaller than if the internal circuits of the semiconductor integrated circuit device are normally operated with the clock A. However, it can be determined from outside of the semiconductor integrated circuit device that the internal circuits thereof are operating in a manner that is clearly different from the time when they are normally operated. Therefore, the effect that makes the internal processing operation of the semiconductor integrated circuit device difficult to analyze from outside is reduced.

According to the present embodiment, the internal circuits of the semiconductor integrated circuit device are operated with the clock C and at the same time current generating circuit 102 is operated with the clock B. At this time, the value (average value) of the consumed current is substantially the same as the value of the consumed current at the time when the internal circuits of the semiconductor integrated circuit device are normally operated with the clock A. However, since it is difficult to distinguish the consumed current waveform that is observed at this time from the consumed current waveform that is observed when the internal circuits are normally operated with the clock A, it is difficult to analyze the dependency of data being processed on the consumed current waveform even when the consumed current waveform is observed. Therefore, it is difficult to reproduce the data.

The semiconductor integrated circuit device according to the present embodiment makes it difficult to reproduce saved data based on the observation of a consumed current waveform, the ability to protect programs and internal data saved in the semiconductor integrated circuit device is increased. Furthermore, the consumed current is prevented from unnecessarily increasing because there is no need to supply a false current at all times to a semiconductor integrated circuit device.

2nd Embodiment

Figure 4:
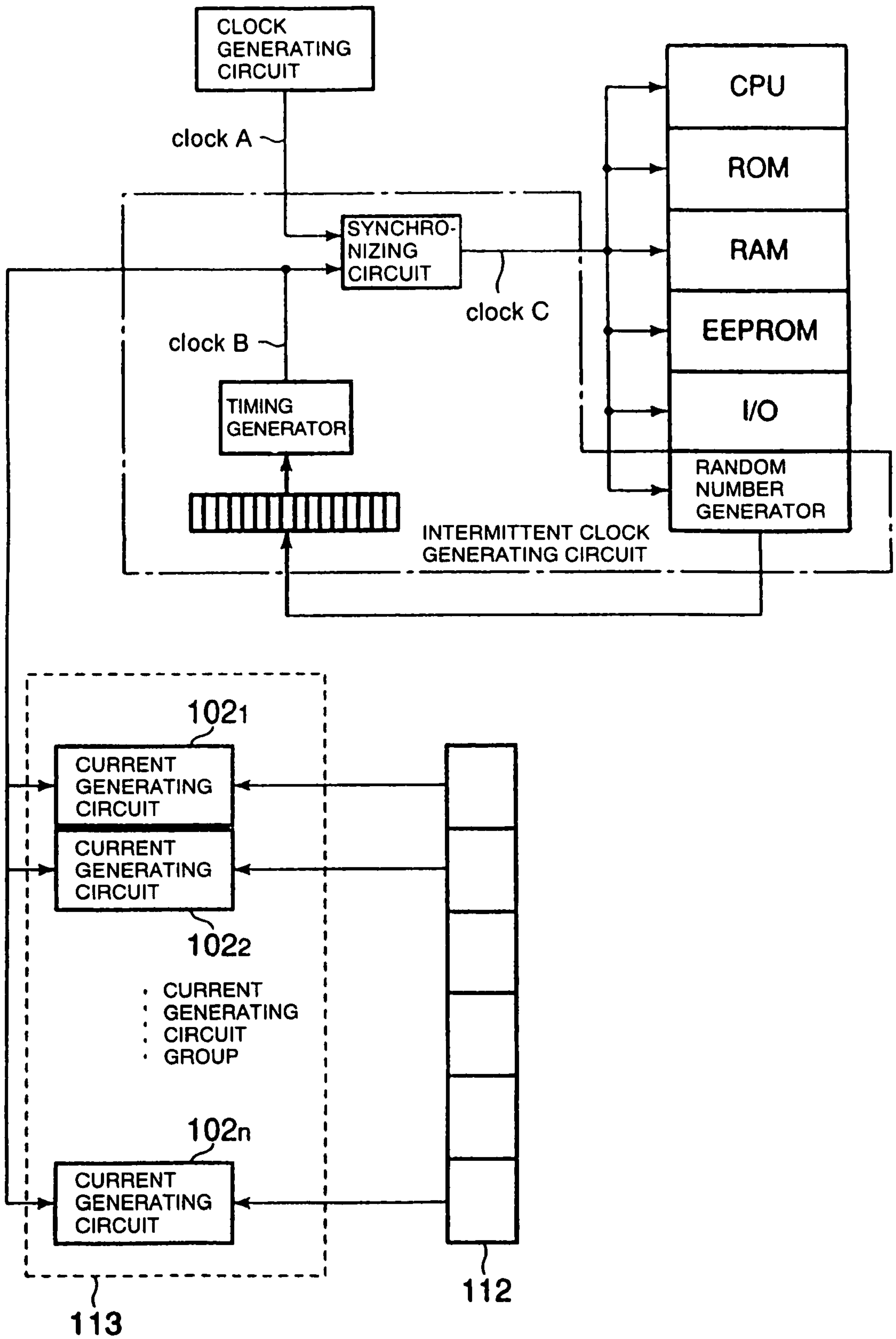
FIG. 4 is a block diagram of a semiconductor integrated circuit device according to a second embodiment of the present invention.

As shown in FIG. 4, a semiconductor integrated circuit device according to a second embodiment of the present invention is similar to the semiconductor integrated circuit device according to the first embodiment except that it additionally has current generating circuit group 113 comprising a plurality of current generating circuits $\mathbf{102}_1$ through $\mathbf{102}_n$ (n is a positive integer), and circuit selecting register 112 for selecting a current generating circuit to be operated, in addition to the circuit arrangement shown in FIG. 1. Other structural and operational details of the semiconductor integrated circuit device according to the second embodiment are identical to those of the semiconductor integrated circuit device according to the first embodiment, and will not be described below.

Circuit selecting register 112 is arranged such that a desired value can be written therein from an external circuit through a data bus, for example.

Current generating circuits 102$_1$ through 102$_n$ are selected beforehand according to a value stored in current selecting register 112, and the selected current generating circuit is operated with the block B that is output from the timing generator.

For example, if a bit 0 of current selecting register 112 is assigned to current generating circuit 102$_1$, then when the value stored in current selecting register 112 is "1H", i.e., when the bit 0 is "1", current generating circuit 102$_1$ is operated with the block B. Similarly, current generating circuits 102$_2$ through 102$_n$ that are assigned to other bits of current selecting register 112 are operated with the clock B when the corresponding bits are "1". Current generating circuits 102$_1$ through 102$_n$ may be selected and operated one at a time, or more than one of current generating circuits 102$_1$ through 102$_n$ may be selected and operated simultaneously. Current generating circuits 102$_1$ through 102$_n$ may be arranged such that currents consumed thereby are different from each other or equal to each other.

With the semiconductor integrated circuit device according to the second embodiment, since a circuit or circuits selected from current generating circuits 102$_1$ through 102$_n$ are operated, a consumed current waveform that is closer to the consumed current waveform that is observed when the internal circuits are normally operated is achieved than with the semiconductor integrated circuit device according to the first embodiment. Accordingly, the semiconductor integrated circuit device according to the second embodiment makes it more difficult to reproduce saved data based on the observation of a consumed current waveform, and hence the ability to protect programs and internal data saved in the semiconductor integrated circuit device is further increased.

3rd Embodiment

As shown in FIG. 5, a semiconductor integrated circuit device according to a third embodiment of the present invention is similar to the semiconductor integrated circuit device according to the second embodiment except that the random number generated by the random number generator is supplied through a register 209 to circuit selecting register 212. Other structural and operational details of the semiconductor integrated circuit device according to the third embodiment are identical to those of the semiconductor integrated circuit device according to the second embodiment, and will not be described below.

According to the third embodiment, register 209 temporarily holds the random number generated by the random number generator and supplies the random number to circuit selecting register 212. Therefore, circuit selecting register 212 randomly selects a current generating circuit that is to be operated with the clock B, from the current generating circuit group.

Since the randomly selected current generating circuit is operated with the clock B, it is more difficult to reproduce saved data based on the observation of a consumed current waveform than with the semiconductor integrated circuit device according to the second embodiment. Consequently, the ability to protect programs and internal data saved in the semiconductor integrated circuit device is much higher.

In the first through third embodiments, the timing generator and the current generating circuit are operated based on the random number output from the random number generator. However, the output value of a circuit (variable data output circuit), such as a timer, a shift register, or an internal bus of the semiconductor integrated circuit device, whose data varies with time during operation of the semiconductor integrated circuit device, may be used instead of the random number for operating the timing generator and the current generating circuit.

While preferred embodiments of the present invention have been described using specific terms, such description is for illustrative purposes only, and it is to be understood that changes and variations may be made without departing from the spirit or scope of the following claims.

What is claimed is:

1. A semiconductor integrated circuit device having a plurality of internal circuits operable in synchronism with an internal clock, comprising:

a clock generating circuit for generating a first clock having a predetermined period;

an intermittent clock generating circuit for generating a second clock which comprises an intermittent train of pulses produced by removing some pulses from said first clock, and supplying said second clock as said internal clock to said internal circuits; and at least one current generating circuit for consuming a power supply current in timed relation to a third clock which comprises a train of pulses to be removed from said first clock.

2. The semiconductor integrated circuit device according to claim 1, wherein said intermittent clock generating circuit comprises:

a variable data output circuit for outputting data which is variable with time;

a timing generator for generating said third clock according to the data output from said variable data output circuit; and a synchronizing circuit for generating said second clock by being supplied with said third clock and said first clock output from said clock generating circuit and stopping outputting said first clock in timed relation to said third clock.

3. The semiconductor integrated circuit device according to claim 2, wherein said variable data output circuit is a random number generator for generating a random number.

4. The semiconductor integrated circuit device according to claim 1, further comprising:

a current generating circuit group comprising a plurality of said current generating circuits; and a circuit selecting register for selecting at least one of said current generating circuits which is to consume said power supply current, according to a prestored value.

5. The semiconductor integrated circuit device according to claim 2, further comprising:

a current generating circuit group comprising a plurality of said current generating circuits; and a circuit selecting register for selecting at least one of said current generating circuits which is to consume said power supply current, according to the data output from said variable data output circuit.

* * * * *